Patented Feb. 27, 1951

2,543,472

UNITED STATES PATENT OFFICE 2,543,472

NITRO CYCLIC ACETALS

Murray Senkus, Terre Haute, Ind., assignor to Commercial Solvents Corporation, Terre Haute, Ind., a corporation of Maryland No Drawing. Application October 12, 1949, Serial No. 121,058

8 Claims. (Cl. 260—338)

My invention relates to new and useful acetals of 2,2'-bi-(2-nitro-1,3-propanediol), and to a process for producing the same. More particularly, it is concerned with acetals having the following structural formula:

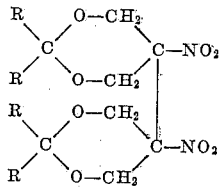

in which R may be either hydrogen, alkyl, phenyl, or phenylalkyl. As examples of such compounds there may be mentioned formaldehyde 2,2'-bi-(2-nitro-1,3-propanediol) diacetal, acetaldehyde, 2,2'-(2-nitro-1,3-propanediol) diacetal, acetone 2,2'-bi-(2-nitro-1,3-propanediol) diacetal, methyl ethyl ketone 2,2'-bi-(2-nitro-1,3-propanediol) diacetal, benzaldehyde 2,2'-bi-(2-nitro-1,3-propanediol) diacetal, acetophenone 2,2'-bi-(2-nitro-1,3-propanediol) diacetal, benzophenone 2,2'-bi-(2-nitro-1,3-propanediol) diacetal, and methyl benzyl ketone 2,2'-bi-(2-nitro-1,3-propanediol) diacetal.

These compounds may, in general, be prepared by reacting hydrogen peroxide with an alkali or alkaline earth metal salt of acetals of aci-2-nitro-1,3-propanediol. I prefer, however, to use the alkali metal salts in my process. The reaction may be carried out at from 5 to 95° C. under normal atmospheric pressure. I have found it desirable, however, to use temperatures in the range from 15–35° C. No special methods of adding or mixing the ingredients are required, although I have found that a slow addition of the hydrogen peroxide to the reaction mixture is a very satisfactory method. A rapid addition of the hydrogen peroxide will generally cause an abrupt rise in temperature, but which may be controlled by using a water bath to bring the temperature back to the preferred range.

Commercial grades of hydrogen peroxide generally range in strength from about 25 to 90% by weight in aqueous solution. I can use any of these commercial strengths in my process, since a further dilution is effected by the presence of water in the reaction mixture. I can use concentrations of hydrogen peroxide in my reaction mixture of from ½ to 25% by weight, and preferably from 2 to 10%. The amount of water in the reaction mixture necessary to produce these concentrations from the commercial strengths can easily be determined by a simple calculation.

Under any of the operating conditions that I have disclosed above, the reaction will be substantially complete in twenty-four hours. When using my preferred operating conditions, I have found that the reaction will be substantially complete in twelve hours, and that about one half of the desired product will be produced in from two to three hours.

The product will form as a precipitate in the reaction mixture, since my new compounds are practically insoluble in basic aqueous solutions. I have found that the lowering of the temperature of the reaction mixture is not of great assistance in forming the precipitate. Therefore, I prefer to recover the product by filtration at about room temperature. The product thus recovered will in general be relatively pure. If it is desired to purify these materials further, however, they may be recrystallized from cyclohexane, or a 1:1 methanol-water mixture. The filtrate recovered, as above, may be treated with a small quantity of hydrogen peroxide to determine whether the reaction has gone to completion. If it has not, an additional quantity of product will form on allowing the treated filtrate to stand for a short time.

The alkali or alkaline earth metal salts of acetals of aci-2-nitro-1,3 propanediol which may be utilized in the preparation of the acetals of my invention may be represented by the general formula:

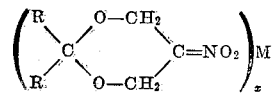

in which R may be either hydrogen, alkyl, phenyl, or phenylalkyl, M may be either an alkali or an alkaline earth metal and $x$ is one of the integers 1 and 2.

It is apparent from a consideration of my process that it involves detachment of the alkali metal radical by reaction with hydrogen peroxide with concurrent dimerization of the organic radical. This observation makes it obvious that either two like or two unlike monomers may be dimerized by my process, providing the monomers are of the type of the above structural formula. It is also apparent, however, that if two unlike monomers of the type indicated are reacted with hydrogen peroxide in my process that three products will be produced. This complicates the recovery of the individual dimers, but does not effect the reaction. Various methods of separating mixtures of such dimers will be readily apparent to those skilled in the art, or can be determined by simple experiment.

The aldehyde acetals of the polyhydric nitro alcohols from which the alkali or alkaline earth metal salts are formed for use in my process, can be prepared by any suitable means. I prefer, however, to prepare such compounds in accordance with the procedure described in my U. S. Patent No. 2,297,921. According to this procedure a mixture consisting of a polyhydroxy nitro compound and the desired aldehyde is distilled in the presence of a small amount of a mineral acid catalyst such as concentrated hydrochloric or sulfuric acids.

The ketone acetals of the polyhydric nitro alcohols, I prefer to prepare in accordance with the procedure described in my U. S. Patent No. 2,368,071. This procedure is similar to that used for the preparation of the aldehyde acetals. A mixture of a polyhydroxy nitro compound and the desired ketone is distilled in the presence of a small amount of an acid catalyst such as para-toluenesulfonic acid.

Further details concerning the preparation of both the aldehyde and ketone acetals may be obtained by consulting my patents cited above.

The following examples are illustrative of my invention, but are not to be construed as limiting its scope, since modifications will readily occur to those in the art.

Example I

Acetone 2,2'-bi-(2-nitro-1,3-propanediol) diacetal was prepared by dissolving 99 grams of acetone-tris-(hydroxymethyl)-nitromethane acetal and 50 grams of sodium hydroxide in 300 milliliters of water. Fifty milliliters of 30% aqueous hydrogen peroxide was slowly added to this solution with agitation. By controlling the temperature with a cold water bath, the temperature rose to about 75° C. just after the addition of the hydrogen peroxide and then was dropped to about 20° C. for the rest of the reaction period. After 45 minutes of agitation, the mixture was filtered, and a crystalline product weighing 4.5 grams was obtained. The filtrate yielded an additional 1.5 grams of crystals after standing for 30 minutes, and an additional 5.0 grams of crystals after standing for 10 hours. Treatment of the final filtrate with 50 milliliters of 30% aqueous hydrogen peroxide yielded 0.5 gram of product, while treatment of the filtrate from that separation with 150 milliliters of 30% aqueous hydrogen peroxide yielded 0.1 gram of product. The five groups of crystals were combined and the composite was recrystallized once with cyclohexane, and once from a 1:1 methanol-water mixture. The final crystallization gave a solid material which was analysed by standard methods.

*Analysis.*—Calculated for $C_{12}H_{20}N_2O_8$: C, 45.00; H, 6.29; N, 8.75; molecular weight, 320.3; found: C, 45.06; H, 6.22; N, 8.84; molecular weight 324.

Example II

Benzaldehyde tris-(hydroxymethyl)-nitromethane acetal was allowed to react with an aqueous solution of calcium hydroxide to form calcium benzaldehyde aci-2-nitro-1,3-propanediol acetal. Aqueous hydrogen peroxide was then added, and benzaldehyde 2,2'-bi-(2-nitro-1,3-propanediol) diacetal was prepared according to the procedure in Example I.

*Analysis.*—Calculated for $C_{20}H_{20}N_2O_8$: C, 57.66; H, 4.84; N, 6.73; molecular weight, 416.2; found: C, 57.72; H, 4.70; N, 6.90.

Example III

The procedure described in Example I was followed to prepare methyl benzyl ketone 2,2'-bi-(2-nitro-1,3-propanediol) diacetal from potassium methyl benzyl ketone aci-2-nitro-1,3-propanediol acetal.

*Analysis.*—Calculated for $C_{24}H_{28}N_2O_8$: C, 60.99; H, 5.96; N, 5.94; molecular weight, 472,2; found: C, 60.90; H, 5.98; N, 5.83; molecular weight 469.5.

The diacetals prepared as outlined above are colorless, odorless, crystalline solids. They are insoluble in aqueous alkali solutions; slightly soluble in water; and moderately soluble in organic solvents such as methanol, cyclohexane, benzene, and acetone.

The diacetals of my invention have been found to be useful as synthetic intermediates for the preparation of new diamines as described in my copending application, U. S. Serial No. 121,059, filed October 12, 1949. Other uses for such products will readily occur to those skilled in the art.

My invention now having been described, what I claim is:

1. As new chemical compounds, acetals of 2,2'-bi-(2-nitro-1,3-propanediol) having the following structural formula:

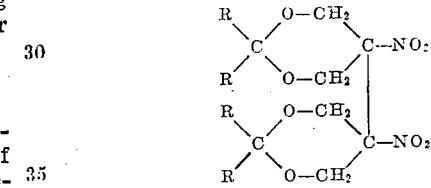

wherein R is a member selected from the group consisting of hydrogen, alkyl, phenyl, and phenylalkyl.

2. Acetone 2,2'-bi-(2-nitro-1,3-propanediol) diacetal.

3. Benzaldehyde 2,2'-bi-(2-nitro-1,3-propanediol) diacetal.

4. Methyl benzyl ketone 2,2'-bi-(2-nitro-1,3-propanediol) diacetal.

5. In a process for the production of diacetals of 2,2'-bi-(2-nitro-1,3-propanediol), the step which consists of reacting hydrogen peroxide in aqueous solutions with a metal salt of acetals of aci-2-nitro-1,3-propanediol having the following structural formula:

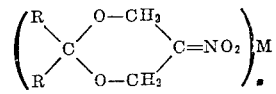

in which R is a member selected from the group consisting of hydrogen, alkyl, phenyl, phenylalkyl, and M is a member selected from the group consisting of the alkali and alkaline earth metals and $x$ is one of the integers 1 and 2.

6. In a process for the production of acetone 2,2'-bi-(nitro-1,3-propanediol) diacetal, the step which consists of reacting hydrogen perioxide in aqueous solution with a metal salt of acetone aci-2-nitro-1,3-propanediol acetal said metal consisting of a member selected from the group of the alkali and alkaline earth metals.

7. In a process for the production of benzaldehyde 2,2'-bi-(2-nitro-1,3-propanediol) diacetal, the step which consists of reacting hydrogen peroxide in aqueous solution with a metal salt of benzaldehyde aci-2-nitro-1,3-propanediol acetal said metal consisting of a member selected from the group of the alkali and alkaline earth metals.

8. In a process for the production of methyl benzyl ketone 2,2'-bi-(2-nitro-1,3-propanediol) diacetal, the step which consists of reacting hydrogen peroxide in aqueous solution with a metal salt of methyl benzyl ketone aci-2-nitro-1,3-propanediol acetal said metal consisting of a member selected from the group of the alkali and alkaline earth metals.

MURRAY SENKUS.

REFERENCES CITED

The following references are of record in the file of this patent:

UNITED STATES PATENTS

| Number | Name | Date |
|---|---|---|
| 2,297,921 | Senkus | Oct. 6, 1942 |
| 2,368,071 | Senkus | Jan. 23, 1945 |